United States Patent [19]
Bickford et al.

[11] Patent Number: 4,791,839
[45] Date of Patent: Dec. 20, 1988

[54] APPARATUS AND METHOD FOR DETERMINING TORQUE AND PRESENTING DIGITAL TORQUE READOUT IN A TORQUE WRENCH SYSTEM

[75] Inventors: John H. Bickford, Middletown; Jesse R. Meisterling, Hampton, both of Conn.; Milton O. Smith, Bothell, Wash.

[73] Assignee: Raymond Engineering Inc., Middletown, Conn.

[21] Appl. No.: 869,178

[22] Filed: May 30, 1986

[51] Int. Cl.⁴ .......................................... B25B 23/144
[52] U.S. Cl. ........................................ 81/479; 73/761;
73/862.73; 73/862.25
[58] Field of Search ............... 81/467, 479, 57.39,
81/57.44, 57.46, 57.42, 469; 73/761, 862.21,
862.25, 708, 862.37, 862.23

[56] References Cited
U.S. PATENT DOCUMENTS
3,745,820 7/1973 Weiner .............................. 73/862.25
4,211,120 7/1980 Tambini .............................. 73/761
4,468,968 9/1984 Kee ..................................... 73/708

FOREIGN PATENT DOCUMENTS
0133557 2/1985 European Pat. Off. ............. 81/479
1560529 2/1980 United Kingdom .
1577526 10/1980 United Kingdom .

Primary Examiner—James G. Smith
Attorney, Agent, or Firm—Fishman, Dionne & Cantor

[57] ABSTRACT

Apparatus and a method are presented for determining the torque load applied to a fastening element by a fluid powered wrench, and displaying a digital readout of the torque. The operating pressure of the wrench, after compensation for the temperature of the pressure transducer, is converted to a torque measurement by programmed microprocessor and the torque value is displayed on a digital readout. The system is useable with and adjusts for wrenches of several sizes by an input selector switch connected to the microprocessor.

17 Claims, 6 Drawing Sheets

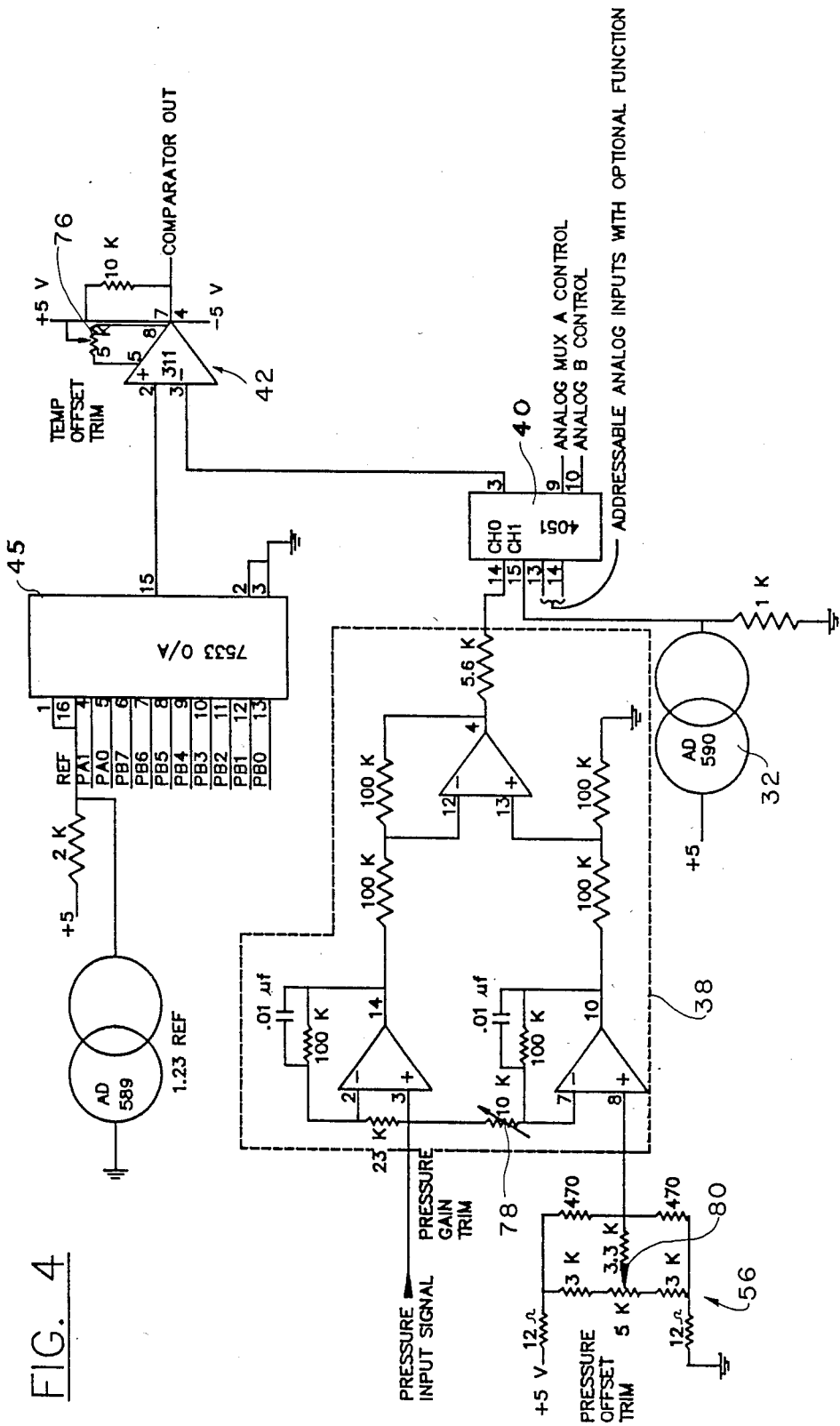

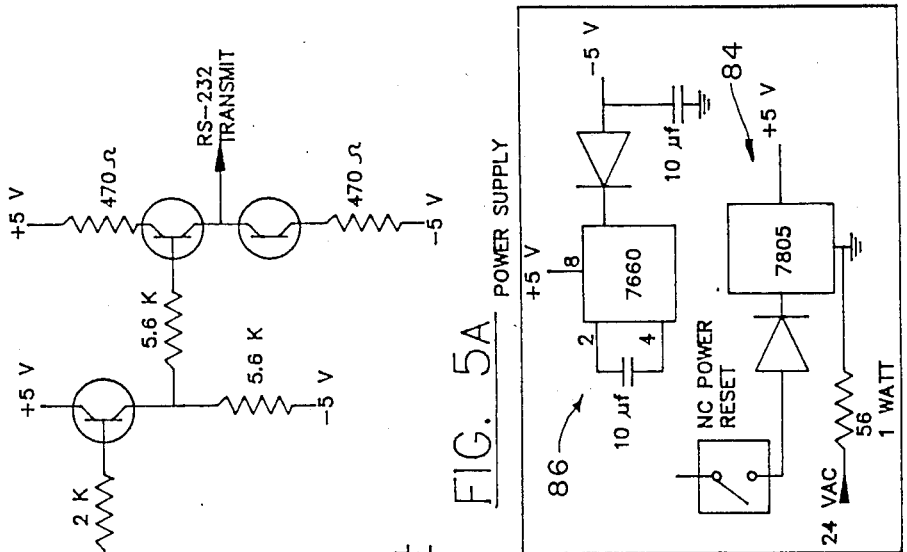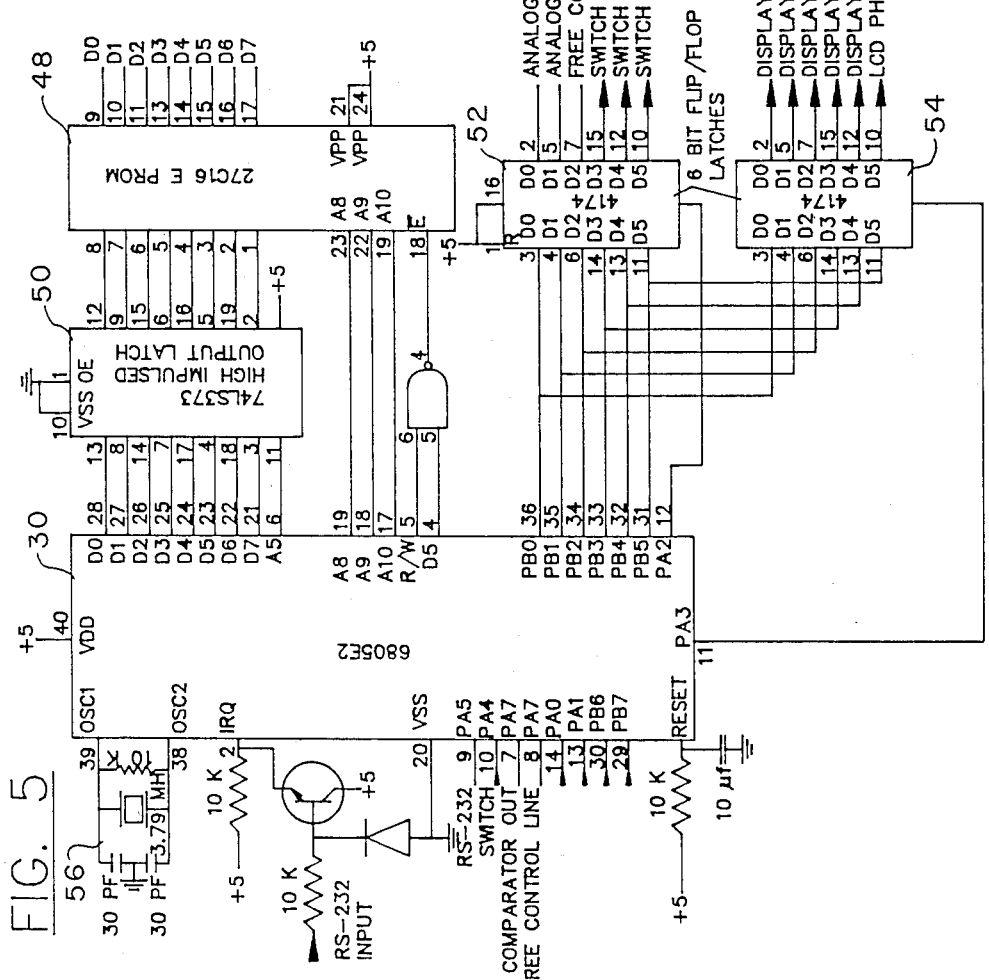

APPARATUS AND METHOD FOR DETERMINING TORQUE AND PRESENTING DIGITAL TORQUE READOUT IN A TORQUE WRENCH SYSTEM

FIELD OF THE INVENTION

This invention relates to the field of fluid powered torque wrenches. More particularly, this invention relates to the field of torque measurement of fluid powered torque wrenches.

DISCUSSION OF THE PRIOR ART

Fluid powered torque wrenches are well known in the art. By way of example, one type of ratcheting, hydraulically powered torque wrench is disclosed in U.S. Pat. No. 3,745,858. An improved version of that torque wrench is disclosed in Application Ser. No. 745,404, filed June 14, 1985. Both U.S. Pat. No. 3,745,858 and Application Ser. No. 745,404 are owned by the assignee hereof and are incorporated hereinby reference.

In operating hydraulic torque wrench systems, it is important to know the output, i.e., the torque, generated by the wrench. Prior art torque measurement systems have been susceptible to significant errors which impair the accuracy of such systems. As a result, there has been a long recognized need in the art to improve the torque measurement of such systems.

In general, prior art systems attempt to measure torque by measuring the pressure level (i.e., p.s.i.) of the pump which generates the pressurized operating fluid for the wrench. The p.s.i. output level of the pump is displayed and read on a gage to supposedly reflect the torque output of the wrench.

The above discussed prior art torque measurement systems are deficient and inaccurate in several respects. In a typical prior art system, the maximum torque produced by the tool is determined by manual adjustment of a pressure regulator in the hydraulic line which feed the drive end of the hydraulic cylinder which powers the tool. The operator usually refers to a table or graph furnished by the manufacturer to determine the approximate cylinder pressure for a given output torque. The operator then repeatedly operates control switches in a pendant to advance and then to retract the drive cylinder of the wrench to tighten the bolt. A ratchet in the wrench converts this reciprocating cylinder motiont into continuous clockwise or counterclockwise motion of the nut. The operator keeps operating the switches until the wrench stalls at the preselected pressure. Both the pressure selection and operation of the wrench takes operator skill and time.

Meanwhile a second mechanic must hold the reaction end of the wrench against a reaction surface on the workpiece. If he does not do this the wrench will not ratchet properly (because of backlash between drive bar and socket, socket and nut, etc.).

The torque produced by prior present hydraulic wrenches in determined by reading p.s.i. measurements on a hydraulic pressure gage on the pumping system which powers the wrench. One of the more significant problems with these prior art systems is that they sense and display pressure (p.s.i.) levels, whereas torque (ft. lbs.) is the true parameter of interest, because bolt tightening specifications are expressed in torque. Since a pump may be used with a variety of wrenches (developing different amount of torque for the same supply pressure), means must be provided to account for the different wrenches. Some systems merely provide a gate calibrated in pump pressure, plus supplemental conversion charts to convert pressure to torque for various wrenches. Other prior art systems attempt to present a torque readout or sorts by the use of a pressure gage marked in several torque ranges rather than in psi values. However, a different torque range or scale must be used for each wrench size, making the system susceptible to error and misinterpretation. All of this can be very confusing to and can be misread or misinterpreted by the operator, and can lead to incorrect torques on the bolts being tightened.

SUMMARY OF THE INVENTION

The above discussed and other problems and deficiencies of the prior art are eliminated or significantly reduced by the present invention. In accordance with the present invention, the parameter of interest, i.e., torque, is determined and displayed in a digital readout. By determining torque and presenting a digital readout of the measured torque, the present invention alleviates or eliminates the problems which made the prior art systems error prone and inaccurate.

In accordance with the present invention, torque is determined by a system which includes a transducer which converts the operating pressure of a hydraulic wrench to an analog electrical signal. That analog signal is then digitized, delivered as an input to a microprocessor or computer. The output of a temperature transducer is also digitized and delivered to the microprocessor to compensate for temperature of the pressure transducer. Another input informs the microprocessor or computer of the particular wrench being used in the system. The microprocessor or computer then operates on the input to produce an output signal commensurate with torque. That torque output signal is then delivered to and displayed on a numeric (or alpha/numeric) display as a direct readout of torque. The output from the microprocessor can be programmed to produce a torque output in any desired system of units (e.g. pound-feet or Newton-meters).

The system of the present invention has the principal advantage of presenting torque as a direct readout in a digital display. This does away with the need for the use of conversion charts or tables to convert psi to torque and eliminates a serious source of error in prior art systems. Also when the operator is adjusting the manually operated pressure relief valve to preset the cutoff torque to the wrench, the operator is guided by a real time direct digital display of the torque which each setting of the relief valve would produce, rather than being guided by readings on a pressure gage. As a result, the operator can adjust cutoff pressure to the nearest desired lb-ft (or equivalent), whereas with prior art systems the operator can only set the valve to the nearest cardinal point on the gage, which may be 25 to 50 lb-ft apart. The system of the present invention also has the dual capability to display pump pressure on the digital readout if that parameter is of interest. The system also is capable of direct digital readout of torque for a range of wrench sizes used with the system, thus eliminating the need for gages with overlaps or multiple displays for different wrenches.

The above discussed and other features and advantages of the present invention will be apparent to and understood by those skilled in the art from the following detailed description and drawings.

BRIEF DESCRIPTION OF THE DRAWINGS

Referring now to the drawings, wherein like elements are numbered alike in the several Figures:

FIG. 4 is a schematic showing signal conditoner and analog to digital logic circuitry for use in the system of the present invention.

FIG. 5 is a block diagram showing the microprocessor and associated components.

FIG. 5A is a schematic diagram of a power supply unit used in the present invention.

DESCRIPTION OF THE INVENTION

Figure 1:
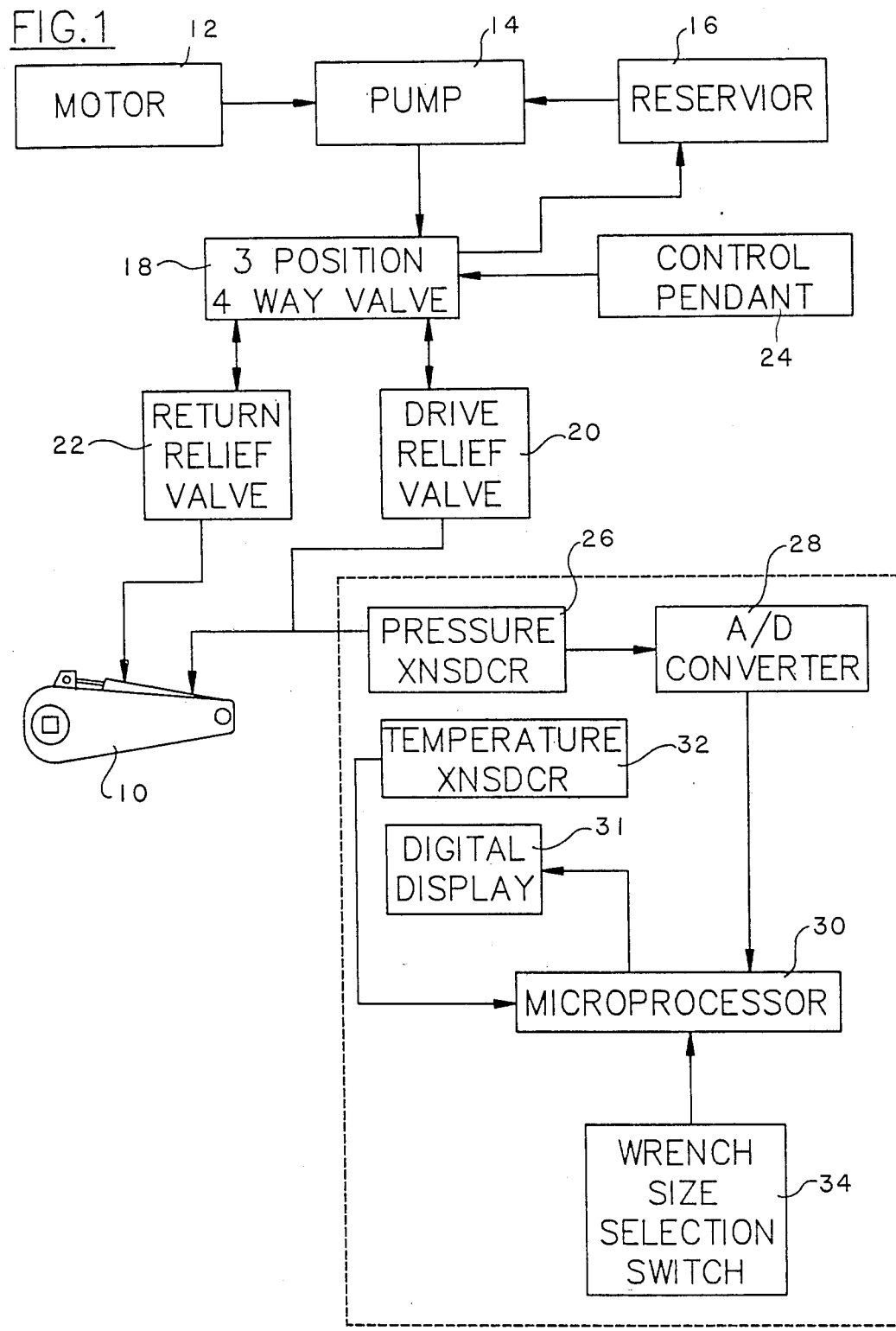
FIG. 1 is a block diagram of the torque measurement and digital torque readout system of the present invention.

Referring first to FIG. 1, a block diagram is shown of the overall system of the present invention. The system includes a conventional hydraulically powered torque wrench 10 (such as identified above) which is powered by a motor 12 and pump 14 supplied from a fluid reservoir 16. Pump 14 delivers pressurized hydraulic fluid to wrench 10 via a manually adjustable pressure relief valve 20, a 3 position 4 way valve 18 and drive and relief valve 22. A control pendant 24 (which may be suspended on a cable and be hand or foot operated, or may be mounted on the wrench or on some other part of the system) controls the position of valve 18 to operate wrench 10 in either a drive stroke or a return stroke. Manually adjustable pressure regulator 20 is set (and can be adjusted as may be required) to establish a maximum pressure level. Return relief valve 22 is typically set to operate at some relatively low pressure (e.g., 400 p.s.i.) to prevent overpressurization of the return side of the drive cylinder of the wrench. Wrench 10 includes a ratchet mechanism so that the wrench can be repeatedly cycled to tighten a fastener such as a nut or bolt. The elements 10-24 described above are all found in a prior art wrench operating system.

Still referring to FIG. 1, the system of the present invention also includes apparatus for determining and for the digital display of the real time torque level of the wrench. That apparatus includes a pressure transducer 26 which senses the pressure level on the drive side of the wrench and generates a voltage output signal. That voltage signal from transducer 26 is delivered to an analog to digital converter 28 (which includes a multiplexer 40, a comparator 42 and a D/A converter 45 (see FIGS. 2 and 4) which, in turn, is connected to a microprocessor 30. A temperature sensor 32 (an AD 590 transducer) senses the temperature at which the pressure transducer is operating and delivers a temperature input signal to microprocessor 30 which compensates for temperature deviation from a standard 75° F. "room temperature". A wrench size selection switch 34 delivers an input signal to microprocessor 30 based on the size of the wrench being used in the system. Microprocessor 30 is programmed to process the various input signals and generate a digital output of the real time torque level of the wrench as it operates which is displayed on a liquid crystal (LCD) display 31.

Figure 2:
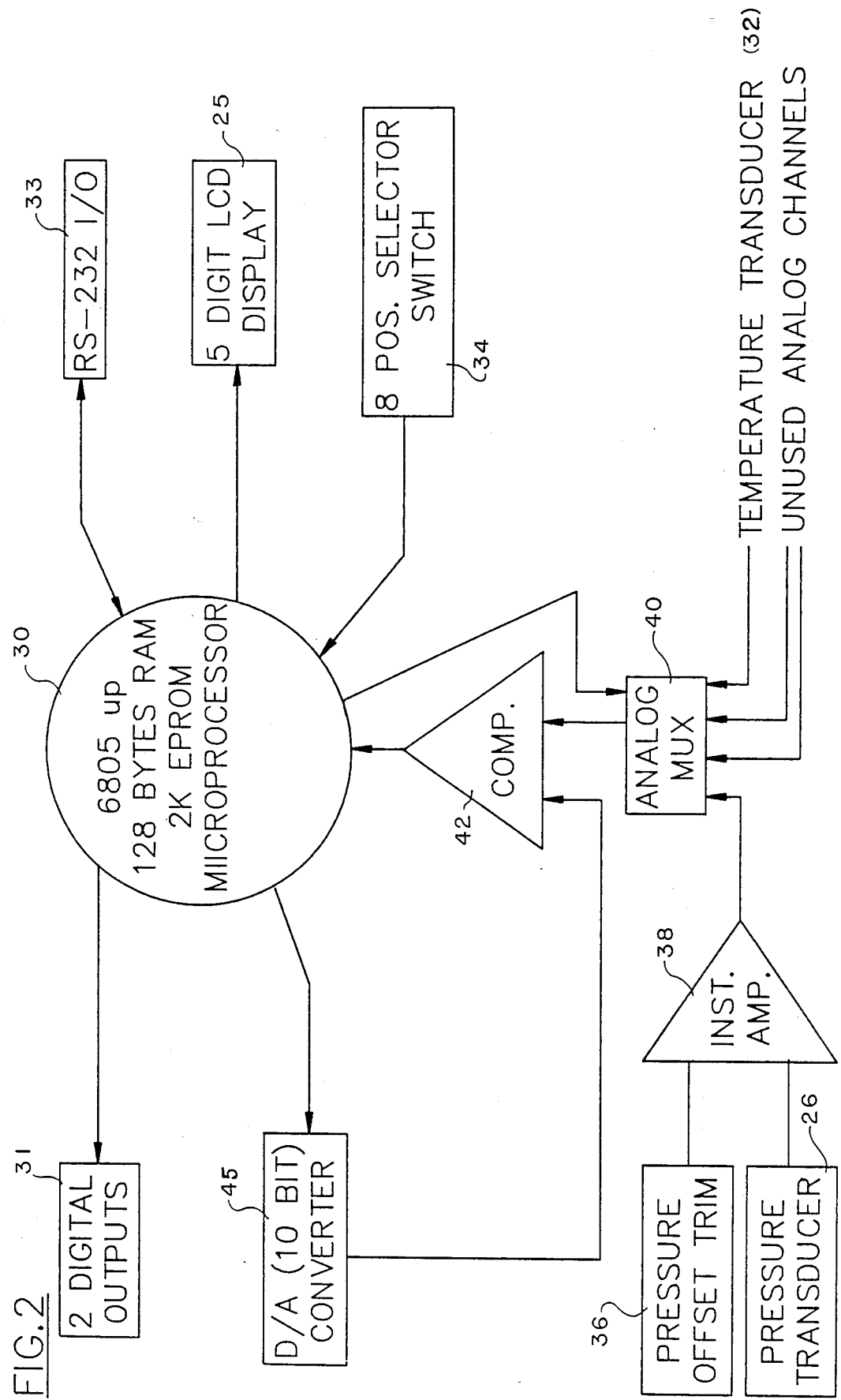
FIG. 2 is a functional diagram of the digital torque readout system of the present invention.

Referring now to FIG. 2, a functional diagram of the torque measuring and display system is shown. Pressure transducer 26 is a half bridge strain gage transducer such as an Model MFP 0-10,000 transducer available from DJ Instruments. The output signal from transducer 26 is balanced against a pressure offset trim bridge 36, and the signals from transducer 26 and trim bridge 36 are delivered to an instrumentation amplifier 38. The output from instrumentation amplifier 38 is delivered to an analog multiplexer 40 which also receives an input signal from temperature transducer 32. Based on a control signal from microprocessor 30, multiplexer 40 delivers either the pressure signal or the temperature signal to a comparator 42. Microprocessor 30 delivers digital signals to digital to analog converter 45 which, in turn, delivers analog voltage to comparator 42. Comparator 42 compares the input from multiplexer 40 (either pressure or temperature signals) with the input from D/A converter 45. When the input to comparator 42 from multiplexer 40 exceeds the output from D/A converter 45, the output state of comparator 42 delivers a low logic signal to microprocessor 30. When the input to comparator 42 from multiplexer 40 is lower than the output from D/A converter 45, the output state of comparator 42 delivers a high logic signal to microprocessor 30. The microprocessor 30 determines the pressure or temperature level by matching the D/A converter output to the pressure or temperature sensor.

Wrench size switch 34 also delivers an input signal to microprocessor 30 to inform the microprocessor of the size of the wrench being operated. The signal from selector switch 34 determines a ratio or multiplication factor and offset factor which is stored in permanent memory and which is used by microprocessor 30 to convert the pressure information (as temperature compensated) to a torque value. Microprocessor 30 then generates a torque signal which is delivered to and displayed on LCD display 25.

Microprocessor 30 also has the capacity to drive other digital outputs 31 and communicate with an external computer 33.

Figure 6:
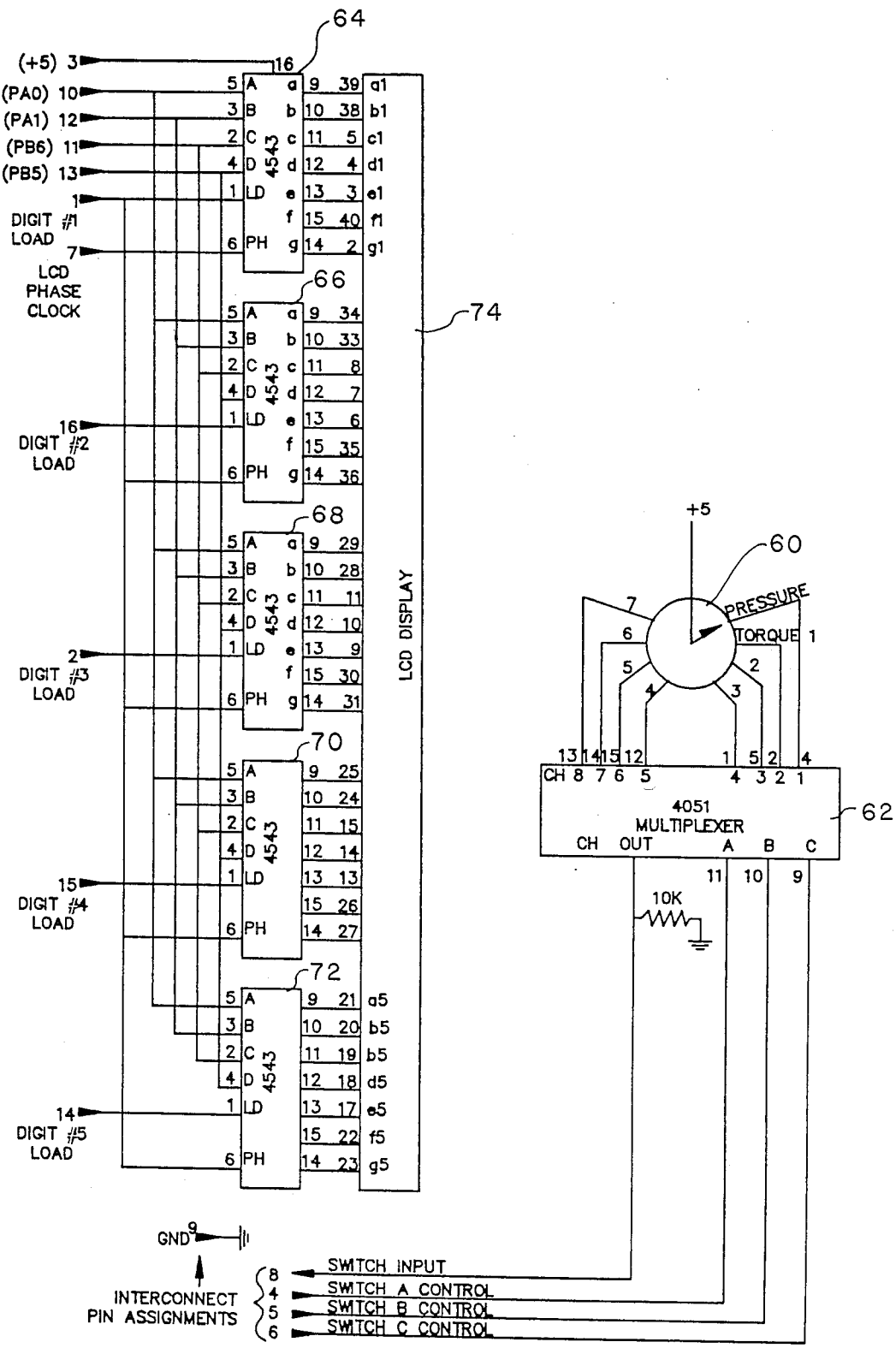
FIG. 6 is a block diagram of the selector switch and LCD display board used in the present invention.

Referring now to a combined consideration of FIGS. 4, 5 and 6, microprocessor 30 is a 6805 CMOS microprocessor that provides for control of LCD display 25, and measurement of temperature and pressure. Microprocessor 30 contains 128 bytes of random access memory (RAM) and is interfaced with a 2K 2716 erasible programmable read only memory (EPROM) 48. Measurement and control functions are provided by 16 input/output (I/O) lines that are an integral part of microprocessor 30. The microprocessor system also includes an output latch 50 with tri-state outputs between EPROM 48 and microprocessor 30. Twelve outputs from microprocessor 30 are provided for control using two 6 bit 4174 flip-flop latches 52, 54. Ten of those outputs also interface with 10 bit digital to analog converter 45 (ICL 7533), (see FIG. 4). The system regulates its own power to +5 volts consuming a maximum of 50 ma of current at this voltage. The microprocessor is driven by a 3.79 MH oscillator 56.

Referring particularly to FIG. 4, the pressure signal from gage pressure transducer 26 is delivered to instrumentation amplifier 38. The output from transducer 26 (which is a half bridge transducer) varies from approximately 2.4 to 2.5 mv over a pressure range of from 0 to 10,000 p.s.i. That output is balanced against a pressure offset trim resistance bridge, and the difference is taken by amplifier 38. The output from amplifier 38 (which is an analog voltage signal commensurate with wrench operating pressure) is delivered to a 4501 analog multiplexer 40. Multiplexer 58 also receives analog voltage inputs commensurate with pressure transducer temperature from temperature transducer 32. Multiplexer 40 is connected to and receives control signals from microprocessor 30 (on the lines marked Mux A Control and Mux B control). As determined by the software program, microprocessor 30 will signal multiplexer 40 to pass either the pressure input voltage signal or the temperature input voltage signal to comparator 42 (LM311).

The analog voltage signal (pressure or temperature) from multiplexer 40 is determined by comparator 42, the 10 bit digital to analog converter 45, and the microprocessor 30. The conversion is controlled by a software algorithm that applies a binary search of digital voltage values to D/A converter 45 for delivery to comparator 42. When the input from D/A converter 45 to comparator 42 is within 1 bit of the input (i.e., pressure or temperature signal) from multiplexer 40 to comparator 42, the digital value of the pressure or temperature is equivalent to that digital value applied to the D/A converter 45. This informs the microprocessor of the pressure or temperature level by equating it to the voltage level in converter 45 set by the microprocessor.

Upon determining the digital voltage, the system software causes the microprocessor 30 to repeat the comparison process 32 times to obtain an average voltage level of the pressure or temperature signal over 5 milliseconds of time. Then, as an additional filtering step, the software causes 16 repeats of the 5 ms (32 readings) step for both temperature and pressure readings prior to the steps of temperature compensation and conversion of pressure readings to torque measurement (both of which are accomplished in the microprocessor under control of the algorithms of the software program).

A mulitple position selection switch 60 (see FIG. 6) interfaces with microprocessor 30 to compute and display torque for wrenches of different sizes. In the present system, switch 60 is an 8 position switch to be used to display torque readings for 7 different size wrenches (switch torque positions 2-8); and one switch position is used for display of pressure when it is desired to know that parameter. Switch 60 is connected to a 4051 analog switch multiplexer 62. Switch multiplexer 62 receives three TTL digital signals from microprocessor 30 (Switch A Control, Switch B Control, Switch C Control) at inputs marked A, B and C, respectively. All of the positions of switch 60 are connected to one of eight input channels of multiplexer 62, the output of which, in turn, is connected to the "Switch Input"pin on microprocessor 30. Each individual switch position (positions 1-8) of switch 60 is connected to the channel "OUT"by a different binary code on the pins A, B, C of multiplexer 62 from the microprocessor, thus providing eight switch position indicators. Microprocessor 30 interrogates switch multiplexer 62 at the rate of 25 times per second to determine the position at which rotary switch 60 is set. Under the control of the software program, calibration or conversion coefficients are applied to the pressure signals to convert them to torque values, which are then displayed on the LCD display system.

As shown in FIG. 5, latch 52 interfaces microprocessor 30 with multiplexer 40 via the lines marked Analog Mux A Control and Analog Mux B Control; and latch 52 also interfaces the microprocessor with switch multiplexer 62 via the lines marked Switch Mux A Control, Switch Mux B Control and Switch Mux C Control. Similarly, latch 54 interfaces microprocessor 30 with the 5 display drivers 64-72 via the Display Digit Load Lines 1-5.

Referring to FIG. 5A, the power supply to the system is shown. Voltage regulator 84 provides voltage regulation to +5 V. Voltage regulator 86 provides precision voltage regulation to −5 volts for comparator 42.

Referring to FIG. 6, microprocessor 30 is connected through 5 4543 display drivers 64-72 to an LCD display 74. The drivers 64-72 convert BCD outputs from microprocessor 30 to the 7 segments comprising each digit to be displayed. A clock generated by timed interrupts within the microprocessor system (from pin 10 on latch 54) is used to generate an AC clock to the LCD display to prevent burn-in of digits on the LCD. All other tasks in the system are also scheduled by interrupts generated by this 25 Hz clock. The output to LCD 74 is updated every 16 interrupts (about 0.6 seconds) under control of the program software.

It should be noted that the system of the present invention also simplifies and makes more accurate the preset operation whereby pressure relief valve is adjusted to set the maximum operating pressure of the system. In the present system, the operator sees the pressure level digitally displayed in real time as he sets valve 20. Furthermore, the operator can accurately set valve 20 to a desired level rather than being limited to the cardinal points on a gage.

The digital torque readout (DTR) system of the present invention should be calibrated for pressure and temperature before initial operation or if there is reason to believe the temperature or pressure transducer has drifted.

Calibration is effected by selection of a special operating mode (under control of the microprocessor and the system software) through selector switch 60. Microprocessor 30 is powered, whereupon display 74 will show an array of 5 digits of 8. Select switch 60 is then cycled from position 1 to position 2 and back to position 1. Selector position 1 will then display pressure and position 6 (torque position 5) will display the temperature correction factor multiplied by 256.

Temperature calibration is effected first with switch 60 in position 6, at which the temperature will be displayed on LCD 74, with 256 being equivalent to 75° F. room temperature. Temperature calibration is then carried out by adjusting a potentiometer 76 in the circuit of comparator 42 until the temperature reading is 256 (75° F., i.e., standard "room temperature"). Thereafter, during normal operation of the system, temperature transducer 32 compensates for operating temperatures different from 75° F.

After temperature calibration is done, the system is calibrated for pressure. To effect pressure calibration, the linear behavior of pressure transducer 26 must be matched to a calibrated pressure gage.

The offset and gain of each individual transducer is adjusted by potentiometers 80 and 78, respectively, until the linear behavior of the transducer is within 2% of the actual pressure.

The DTR system of the present invention is controlled by microprocessor 30 and the software program in EPROM 48. Much of the program and its operation have been described in the course of the foregoing description. The entire program stored in EPROM 48 is set forth in Table 1 below (attached hereto as an appendix). The program of Table 1 has five columns. Column (1) is a 4 digit hexadecimal address column; column (2) is a column showing the 4 digit hexadecimal machine code representation of columns (3) and (4); column (3) shows the operand or op code; column (4) shows the argument; column (5) lists remarks briefly explaining the nature of the operation being carried out. Those skilled in the art will find the program listed in Table 1 to be a complete and precise description of each step carried out in the program of the present invention. Accordingly, for purposes of clarity and brevity, only the major operations carried out by the program will be described in general terms (in addition to the program description already given in the foregoing discussion of hardware and operation).

Figure 3B:
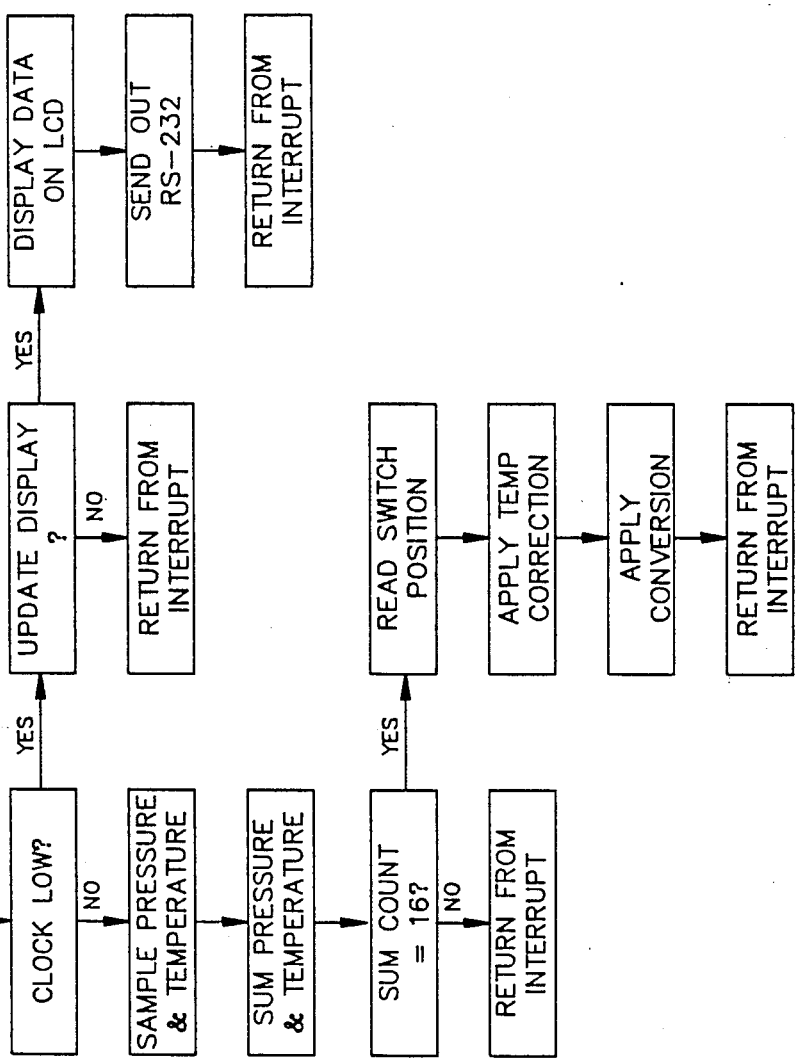
FIGS. 3A and 3B show a flow chart of the microprocessor or computer program for the digital torque readout system of the present invention.
Figure 3A:
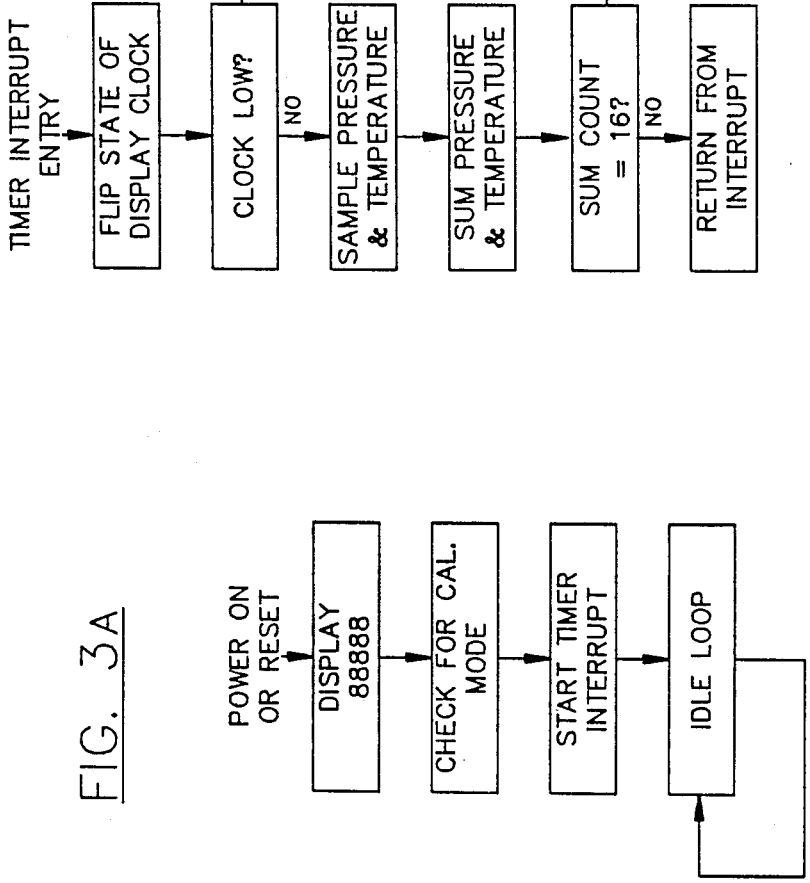

Referring to FIGS. 3A and 3B, a flow chart of the principal features of the program are shown. FIG. 3A shows the program for processor initialization and calibration. FIG. 3B shows the main operating program.

Referring first to FIG. 3A, on powering up the system, a display of five 8 digits appears on display 74. Then, the program checks to see if the calibration mode has been initiated. The 25 Hz timer interrupt clock is started and goes to an idle hoop if the calibration mode has been initiated.

If the calibration mode has not be initiated, a timer interrupt signal is delivered to flip the state of the display clock. If the clock is high, the program directs the micorprocessor to determine the pressure and temperature readings (this is done 32 times); and an attempt is made to repeat for 16 times the 32 readings of pressure and temperature. The 16 repeats are sychronized to the timer interrupt signal. After the 16th reading, the microprocessor reads the position of selector switch 60, then temperature correction is applied to the pressure reading, and the pressure is converted to torque per the conversion algorithm in the program.

If the clock is low and after the 16th reading, a signal is delivered to update the LCD display. After the 16th reading, a signal is delivered to update the display before receipt of a timer interrupt signal, inputs are delivered to update the display on the display 74. If an external computer is connected to the system, signals may also be delivered to it when the display is updated. As described previously, the main part of the program is interrupt driven by the 25 Hz clock in the system.

Those skilled in the art will understand that the present invention presents a unique method and apparatus for determining actual torque beinga pplied to a fastening element by a powered wrench. The torque is determined in real time and presented as a digital display. This invention overcomes problems of long standing and metts a long felt need in the art. Furthermore, this invention simplifies operation of power wrenches, improves their accuracy and reliability, and eliminates serious sources of error in the prior art.

By providing for direct digital readout of torque, the present invention overcomes the several previously discussed problems of the prior art associated with the use of pressure gage readouts.

While preferred embodiments have been shown and described, various modifications and substitutions may be made thereto without departing from the spirit and scope of the invention. Accordingly, it is to be understood that the present invention has been described by way of illustrations and not limitation.

TABLE 1

| 1 | 2 | 3 | 4 | 5 |
|---|---|---|---|---|
| 0000 | | | | ;PAGE ZERO AND SYMBOL ASSIGNMENTS |
| 0000 | | LBYTE | EQU | ;PORT FOR LOW BYTE D/A |
| 0001 | | HBYTE | EQU | ;PORT FOR HIGH BYTE D/A |
| 0002 | | CHAN | EQU | ;LOW 3 BITS SELECT ONE OF EIGHT CHANNELS |
| 0003 | | CHC | EQU | ;LOCATION OF CHANNEL CONTROL (BIT 3) |
| 0004 | | COUT | EQU | ;COMPARATOR OUTPUT FROM D/A |
| 0005 | | RSC | EQU | ;ROTARY SWITCH INPUT TO CPU |
| 0006 | | FPOS | EQU | 1A- ;POSITION OF ROTARY SWITCH |
| 0010 | | ADHB | EQU | 10H ;HIGH BYTE OF A/D CONVERSION |
| 0011 | | ADLB | EQU | ADHB+1 ;LOW BYTE OF A/D CONVERSION |
| 0012 | | DECI | EQU | ;LOCATION OF LSB OF BCD VALUES TO DISP |
| 0006 | | LDI | EQU | ;LOW ORDER HALF-NIBBLE FOR DISPLAY |
| 0007 | | HDI | EQU | ;HIGH ORDER HALF-NIBBLE FOR DISPLAY |
| 0018 | | DP | EQU | 16- ;DISPLAY DIGIT MASK POSITION |
| 0022 | | IVL | EQU | ;TWO BYTE INTEGER TO CONVERT TO BCD |
| 0023 | | BVL | EQU | ;START OF SECOND BYTE OF BCD CONVERSION |
| 0017 | | LCTC | EQU | ;LCD CLOCK (BIT 5) |
| 001E | | CHAR | EQU | ;TEMP CHAR LOCATION FOR RS232 OUTPUT CHAR |
| 0005 | | OUT | EQU | ;OUTPUT BIT OF OUTPUT PORT (PA4) |
| 0004 | | PUT | EQU | ;RS-232 OUTPUT PORT ASSIGNMENT |
| 001F | | COUNT | EQU | ;TEMP COUNT WORD |
| 0018 | | F- | EQU | ;MOST SIG BYTE OF MULTIPLICAND |
| 0019 | | F_ | EQU | F+1 ;LEAST SIG BYTE OF MULTIPLICAND |
| 001A | | TEMP4 | EQU | F+2 ;MULTIPLIER AND MOST SIG BYTE OF RESULT |
| 001B | | TEMP3 | EQU | TEMP4-1 ;MULTIPLIER AND NEXT MOST SIG BYTE OF RESULT |
| 001C | | G- | EQU | TEMP4+1 ;THIRD SIG BYTE OF MULTIPLY RESULT |
| 001D | | G_ | EQU | G+1 ;LEAST SIG BYTE OF MULTIPLY RESULT |
| 001E | | APS | EQU | G+2 ;ALTERNATE PRINT SWITCH FOR TEMP/PRES |

```
0020            BCNT    EQU     APS+1           ;BIT COUNT FOR RS232 GET CHAR SUBROUTINE
0021            OFSET   EQU     BCNT+1          ;A/D OFFSET ON POWER UP
0018            UDT     EQU     1E              ;UPDATE DISPLAY DELAY TIME
0023            TCHAN   EQU     OFSET+2         ;A/D CHANNEL SELECTED TO CONVERT
0026            MODE    EQU     TCHAN+1         ;(0) CALIBRATE (1) NORMAL
0027            TH      EQU     MODE+1
0028            TL      EQU     TH+1
0029            SH      EQU     TL+1
002A            SL      EQU     SH+1

0100                    ORG     100H
0100 A6FF       STRT:   LDA     #0FFH
0102 B703               STA     3               ;SET PORT TO OUTPUTS
0104 A64F               LDA     #4FH
0106 B704               STA     4               ;SET HIGH BYTE DATA DIRECTION
0108 3F08               CLR     8               ;RESET TIMER DATA REG.
010A A606               LDA     #6              ;PRESCALE=128-ENABLE INTER-TIMER
010C B709               STA     9               ;TIMER CONTROL REG.
010E 3F17               CLR     LCDS            ;CLEAR LCD DECAY STATE
0110 1A17               BSET    5,LCDS
0112 A600               LDA     #00
0114 B711               STA     DPCI            ;INITIALIZE DISPLAY TO ALL BLANKS
0116 A600               LDA     #0
```

| 1 | 2 | 3 | 4 | 5 |
|---|---|---|---|---|
| 0118 B712 | | STA | LDD | |
| 011A 1A17 | | BSET | OUTPUT | ;INITIALIZE RS232 STATE |
| 011C 3F18 | | CLR | PH | |
| 011E 3F1C | | CLR | PL | |
| 0120 3F20 | | CLR | TH | |
| 0122 3F20 | | CLR | TL | |
| 0124 A610 | | LDA | #10 | |
| 0126 B721 | | STA | APS | |
| 0128 A620 | | LDA | #20H | |
| 012A B700 | | STA | ADD | |
| 012C 1A00 | | BSET | 5,LCDS | |
| 012E 1700 | | BCLR | 3,LCDS | |
| 0130 3F22 | | CLR | OFSET | |
| 0132 3F24 | | CLR | OFSET+1 | |
| 0134 3F26 | | CLR | MODE | |
| 0136 A608 | | LDA | #8 | |
| 0138 CD0171 | | JSR | LCDS | ;SET DISPLAY TO ALL 8'S |
| 013B CD0244 | | JSR | INPS | |
| 013E B614 | | LDA | RPOS | ;CHECK FOR POSITION ZERO ON SWITCH |
| 0140 2620 | | BNE | STA | |
| 0142 3C22 | | INC | OFSET | ;SET LOW ORDER BIT |
| 0144 3F11 | | CLR | ADLE | |
| 0146 1C11 | | BSET | 6,ADLE | |
| 0148 3F18 | ST1: | CLR | ADHE | |
| 014A CD0244 | ST1: | JSR | INPS | |
| 014D B614 | | LDA | RPOS | |
| 014F 2700 | | BEQ | STP | ;LOOP FOR NON-ZERO SWITCH POSITION |
| 0151 1227 | | BSET | 1,OFSET | |
| 0153 3C10 | STK: | INC | ADHE | |
| 0155 26F0 | | BNE | ST1 | |
| 0157 3C11 | | INC | ADLE | |
| 0159 26EC | | BNE | ST1 | |
| 015B CD0244 | | JSR | INPS | |
| 015E B614 | | LDA | RPOS | |
| 0160 2600 | | BNE | STA | |
| 0162 1400 | | BSET | 2,OFSET | |
| 0164 B622 | STA: | LDA | OFSET | |
| 0166 3F22 | | CLR | OFSET | |

```
0168 A107            CMP    #7      ;CHECK FOR ROTARY SWITCH SEQUENCE FOR CALIBRATE
016A 2710            BEQ    ST1
016C 0C26            INC    MODE    ;SET MODE TO NON-ZERO
016E 9A       STD:   CLI            ;ALLOW INTERRUPTS
016F 20FE     MAIN:  BRA    MAIN    ;MAIN LOOP

0171                        ;SUBROUTINE TO DISPLAY TO VALUE IN ACCA
0171 AE14     LED3:  LDX    #4
0173 E711     LED51: STA    DEC0,X
0175 5A              DECA
0176 26FB            BNE    LED51
0178 CD00D1          JSR    DISP
017B E1              RTS

017C                 ;SUBROUTINE TO INPUT A CHARACTER
017C                 ;THIS ROUTINE IS INTERRUPT DRIVEN
017C                 ;THE RS232 INPUT IS CONNECTED TO THE INTERRUPT LINE
017C A608     GETC:  LDA    #8
017E B722            STA    GCNT
0180 2E01            BIL    GET0    ;CHECK FOR NOISE
0182 80              RTI            ;RETURN - FALSE START
0183 4D       GET0:  TSTA           ;DELAY 3 CLOCK CYCLES
0184 CD01C9          JSR    DELAY   ;WAIT ONE BIT TIME
0187 2E03            BIL    GET1    ;CHECK STATE OF INTERRUPT INPUT
0189 99              SEC            ;SET CARRY FOR A HIGH LEVEL
018A 2003            BRA    GET2
018C 9E       GET1:  CLC
018D 2000            BRA    GET2    ;TIMING EQUALIZATION
018F 3618     GET2:  ROR    CHAR    ;ROTATE BIT TO FORM CHARACTER
0191 3A22            DEC    GCNT
0193 26EB            BNE    GET0
0195 CD01C9          JSR    DELAY
0198 B618            LDA    CHAR
019A A47F            AND    #7F
019C A10D            CMP    #0D
019E 2701            BEQ    GET3
01A0 80              RTI
01A1 A60D     GET3:  LDA    #D
01A3 80              RTI            ;RETURN

01A4                 ;SUBROUTINE TO PRINT A CHAR ON ASSIGNED RS232 OUTPUT
01A4 B718     PUTC:  STA    CHAR
01A6 A609            LDA    #9       ;PUT OUT NINE BITS
01A8 B719            STA    COUNT
01AA 9E              CLC             ;START BIT
01AB 2007            BRA    PUTC3
01AD 3618     PUTC5: ROR    CHAR     ;GET NEXT BIT FROM MEMORY
01AF 2404     PUTC2: BCC    PUTC3    ;SET OR CLEAR PORT DEPENDING ON DATA
01B1 1A00            BSET   OUT,PRT
01B3 2004            BRA    PUTC4
01B5 1B00     PUTC3: BCLR   OUT,PRT
01B7 2000            BRA    PUTC4    ;EQUALIZE TIMING
01B9 CD01C9   PUTC4: JSR    DELAY    ;MUST BE TWO BYTE INDEXED JSR FOR TIMING
01BC 3A19            DEC    COUNT
01BE 26ED            BNE    PUTC5    ;STILL MORE BITS?
01C0 1D00            BSET   6,PRT    ;7 CYCLE DELAY
01C2 1A00            BSET   OUT,PRT  ;SEND STOP BIT
01C4 AD00            BSR    DELAY    ;DELAY FOR THE STOP BIT
01C6 AD03            BSR    DELAY    ;SECOND STOP BIT
01C8 81              RTS
01C9 A613     DELAY: LDA    #13      ;SET TO #E FOR 9600 BAUD
01CB 4A       DEL1:  DECA
01CC 26FD            BNE    DEL1
01CE 81              RTS
```

| 1 | 2 | 3 | 4 | 5 |
|---|---|---|---|---|
| 01CF | | | ;SUBROUTINE TO MULTIPLY 16 BITS BY 16 BITS | |
| 01CF BE1A | MULT: | LDY | RPOS | |
| 01D1 5E | | LSLY | | |
| 01D2 D604TC | | LDA | SFAC,Y | ;SHIFT LEFT FOR 16 BIT INTEGER ADDRESS |
| 01D5 B71F | | STA | DH | ;MOVE MULTIPLIER INTO POSITION |
| 01D7 D6047C | | LDA | SFAC+1,Y | |
| 01DA B720 | | STA | DL | |
| 01DC AE10 | | LDX | #16 | ;MULTIPLY BY SCALING FACTOR 16 X 16 |
| 01DE 3F1D | | CLR | TEMPA | |
| 01E0 3F1E | | CLR | TEMPB | |
| 01E2 361F | | ROR | DH | |
| 01E4 3620 | | ROR | DL | |
| 01E6 2408 | NXT: | BCC | ROTAT | |
| 01E8 B61E | | LDA | TEMPB | |
| 01EA BB1C | | ADD | PL | |
| 01EC B71E | | STA | TEMPB | |
| 01EE B61D | | LDA | TEMPA | |
| 01F0 B91B | | ADC | PH | |
| 01F2 B71D | | STA | TEMPA | |
| 01F4 361D | ROTAT: | ROR | TEMPA | |
| 01F6 361E | | ROR | TEMPB | |
| 01F8 361F | | ROR | DH | |
| 01FA 3620 | | ROR | DL | |
| 01FC 5A | | DECX | | |
| 01FD 26E7 | | BNE | NXT | |
| 01FF B61F | | LDA | DH | |
| 0201 BA1E | | ORA | TEMPB | |
| 0203 2717 | | BEQ | MUL1 | |
| 0205 BE1A | | LDY | RPOS | ;DO DOUBLE PRECISION ADD OF OFFSET |
| 0207 5E | | LSLY | | |
| 0208 98 | | CLC | | |
| 0209 B61F | | LDA | DH | |
| 020B DB0491 | | ADC | OFAC+1,Y | |
| 020E B711 | | STA | ADLE | |
| 0210 B61E | | LDA | TEMPB | |
| 0212 D90490 | | ADC | OFAC,Y | |
| 0215 B710 | | STA | ADHE | |
| 0217 A480 | | AND | #80H | |
| 0219 2601 | | BNE | MUL1 | |
| 021B 81 | | RTS | | |
| 021C 3F11 | MUL1: | CLR | ADLE | |
| 021E 3F10 | | CLR | ADHE | |
| 0220 81 | | RTS | | |
| | | | | |
| 0221 | | | ;SUBROUTINE TO DISPLAY DATA | |
| 0221 AE00 | DISP: | LDY | #0 | |
| 0223 E612 | DIL2: | LDA | DECD+1,Y | |
| 0225 2607 | | BNE | DIL1 | |
| 0227 A604 | | LDA | #04H | |
| 0229 E712 | | STA | DPCD+1,Y | |
| 022B 5C | | INX | | |
| 022C 2AF5 | | BPL | DIL2 | |
| 022E 3F18 | DIL1: | CLR | DF | |
| 0230 3C18 | | INC | DF | |
| 0232 AE04 | | LDX | #4 | |
| 0234 1100 | DLOP: | BCLR | 0,LOE | |
| 0236 1300 | | BCLR | 1,LOE | |
| 0238 E611 | | LDA | DECD,Y | |
| 023A A40C | | AND | #0CH | |
| 023C BB00 | | ADD | LOE | |
| 023E B700 | | STA | LOE | |
| 0240 E611 | | LDA | DECD,Y | |
| 0242 A40C | | AND | #0CH | |

```
0244 48            LSLA
0245 48            LSLA
0246 48            LSLA
0247 48            LSLA
0248 B701          STA    HOE
024A B61E          LDA    DF
024C 381E          LSL    DF
024E B400          ORA    HOE
0250 BA17          ORA    LDCC
0252 B701          STA    HOE
0254 1600          BSET   0,LOE
0256 1700          BCLR   0,LOE   ;LATCH DISPLAY DIGIT SELECT
0258 B601          LDA    HOE
025A A40F          AND    #$0F
025C BA17          ORA    LDCC
025E B701          STA    HOE
0260 1600          BSET   0,LOE
0262 1700          BCLR   0,LOE
0264 5A            DECX
0265 2ACF          BPL    DLOP
0267 81            RTS

0268              ;SUBROUTINE TO CONVERT BINARY TO BCD FOR DISPLAY ON LCD
0268 AE07   BTBCD: LDX   #7
026A 6F12   BLOP:  CLR   EVAL,X
026C 5A            DECX
026D 2AFB          BPL   BLOP
026F AE06          LDX   #6
0271 9B     LOP:   CLC
0272 B611   LOOP:  LDA   IVAL+1
0274 DB029D        ADD   TAB+1,X
0277 B711          STA   IVAL+1
0279 B610          LDA   IVAL
027B D9029C        ADC   TAB,X
027E B710          STA   IVAL
0280 2B06          BMI   DWN
0282 5C            INCX
0283 6C12          INC   EVAL,X
0285 9F            RSP
0286 20EA          BRA   LOOP
0288 9B     DWN:   CLC
0289 B611          LDA   IVAL+1
028B D2029D        SBC   TAB+1,X
028E B711          STA   IVAL+1
0290 B610          LDA   IVAL
0292 D2029C        SBC   TAB,X
0295 B710          STA   IVAL
0297 5A            DECX
0298 5A            DECX
0299 2AD6          BPL   LOP
029B 81            RTS                    ;RETURN
029C FFF6   TAB:   DW    -10
029E FF9C          DW    -100
02A0 FC18          DW    -1000
02A2 D8F0          DW    -10000

02A4              ;SUBROUTINE TO DETERMINE POSITION OF ROTARY SWITCH
02A4 AE08   INPS:  LDX   #8     ;MAX POSITIONS IS EIGHT
02A6 3F01          CLR   CHAN
02A8 1400          BSET   2,CHC
02AA 1500          BCLR   2,CHC
02AC 3F14          CLR   REGS
02AE 0B000F INPS1: BRSET  4,RSC,INPS1
```

```
02B1 3C1A           INC     PRDE        ;INC POSITION OF SWITCH
02B3 B601           LDA     CHAN        ;SET 4051 TO NEXT POSITION
02B5 AB0E           ADD     #E
02B7 B701           STA     CHAN
02B9 1400           BSET    2,CHC       ;CLOCK INTO 4174
02BB 1500           BCLR    2,CHC
02BD 5A             DECX
02BE 26EE           BNE     INPS1
02C0 81     INPS2:  RTS

02C1                        ;SUBROUTINE FOR A/D CONVERSION WITH 10 BIT D/A
02C1 D60472  ADC:   LDA     TCHN,X
02C4 B701           STA     CHAN
02C6 B725           STA     TCHAN
02C8 1400           BSET    2,CHC       ;LATCH CHANNEL DATA
02CA 1500           BCLR    2,CHC
02CC 3F01   RPT:    CLR     LBYTE       ;CLEAR D/A PORTS
02CE 1100           BCLR    0,HBYTE
02D0 1300           BCLR    1,HBYTE
02D2 3F10           CLR     ADHE        ;CLEAR OLD A/D READING
02D4 3F11           CLR     ADLE
02D6 AE22           LDX     #22         ;SET TO TRACK ANALOG INPUT FOR 5 READINGS
02D8 12CC           BSET    1,HBYTE     ;DO BINARY SEARCH TO FIND NEW A/D VALUE
02DA 0F0002         BRCLR   7,COUT,C1
02DD 1300           BCLR    1,HBYTE
02DF 1000    C1:    BSET    0,HBYTE

02E1 0F0002         BRCLR   7,COUT,C2
02E4 1100           BCLR    0,HBYTE
02E6 1E01    C2:    BSET    7,LBYTE
02E8 0F0002         BRCLR   7,COUT,C3
02EB 1F01           BCLR    7,LBYTE
02ED 1C01    C3:    BSET    6,LBYTE
02EF 0F0002         BRCLR   7,COUT,C4
02F2 1D01           BCLR    6,LBYTE
02F4 1A01    C4:    BSET    5,LBYTE
02F6 0F0002         BRCLR   7,COUT,C5
02F9 1B01           BCLR    5,LBYTE
02FB 1801    C5:    BSET    4,LBYTE
02FD 0F0002         BRCLR   7,COUT,C6
0300 1901           BCLR    4,LBYTE
0302 1601    C6:    BSET    3,LBYTE
0304 0F0002         BRCLR   7,COUT,C7
0307 1701           BCLR    3,LBYTE
0309 1401    C7:    BSET    2,LBYTE
030B 0F0002         BRCLR   7,COUT,C8
030E 1501           BCLR    2,LBYTE
0310 1201    C8:    BSET    1,LBYTE
0312 0F0002         BRCLR   7,COUT,C9
0315 1301           BCLR    1,LBYTE
0317 1001    C9:    BSET    0,LBYTE
0319 0F0002         BRCLR   7,COUT,C10
031C 1101           BCLR    0,LBYTE
031E                                    ;TRACK SELECTED ANALOG SIGNAL
031E 0F001D C10:    BRCLR   7,COUT,DEC  ;INCREMENT READING UNTIL COMP. IS HIGH
0321 3A01   DRE:    DEC     LBYTE       ;DEC READING UNTIL COMP. IS LOW
0323 B601           LDA     LBYTE
0325 A1FF           CMP     #0FF        ;CHECK FOR UNDERFLOW
0327 2611           BNE     LOW         ;BRANCH IF NO UNDERFLOW
0329 B600           LDA     HBYTE
032B A403           AND     #3
032D 2605           BNE     LO          ;BRANCH IF ZERO
032F 3F01           CLR     LBYTE       ;SET TO LOWEST VALUE
0331 1100           BCLR    0,HBYTE
```

```
0333 1300           BCLF    1,HBYTE
0335 2022           BRA     ADRI
0337 3A00   LOW:    DEC     HBYTE       ;DECREMENT HIGH BYTE
0339 0E00EE LCHM:   BRSET   7,COUT,DAI  ;STAY IN LOOP UNTIL COMP. IS LOW
033C 201F           BRA     ADRI        ;ADD IN READING
033E 3C01   IRD:    INC     LBYTE       ;INC READING UNTIL COMP. IS LOW
0340 261A           BNE     HCHM        ;CHECK FOR LOW BYTE OVERFLOW
0342 B60C           LDA     HBYTE       ;CHECK AND INC HIGH BYTE OF D/A
0344 A403           AND     #3          ;MASK OUT D/A HIGH ORDER BITS
0346 A103           CMP     #3          ;CHECK FOR MAX VALUE
0348 260A           BNE     HC1         ;BRANCH IF NOT MAX
034A A6FF           LDA     #$FF        ;SET D/A TO MAX VALUE
034C B70C           STA     LBYTE
034E 1000           BSET    0,HBYTE
```

|  1  |  2  |  3  |  4  |  5  |
| --- | --- | --- | --- | --- |

```
0350 1200           BSET    1,HBYTE
0352 2006           BRA     ADRI
0354 3C00   HC1:    INC     HBYTE
0356 0F00EE HCHM:   BRCLR   7,COUT,IEI  ;BRANCH IF COMPARATOR IS LOW
0359 9E     ADRI:   CLC                 ;DOUBLE PRECISION ACC OF A'D CONV.
035A B60C           LDA     LBYTE
035C BB11           ADD     ADLF
035E B711           STA     ADLF
0360 B60C           LDA     HBYTE
0362 A403           AND     #3
0364 B910           ADC     ADHE
0366 B710           STA     ADHE
0368 5A             DECA                ; TRACK SIGNAL FOR EIGHT READINGS
0369 26E5           BNE     C1I
036B AE03           LDX     #3
036D 3410   RSFT:   LSR     ADHE        ;DIVIDE READING BY 3
036F 3611           ROR     ADLF
0371 5A             DECA
0372 26F9           BNE     RSFT
0374 B610           LDA     ADHE        ;CHECK PRESURE FOR LESS THAN 150 PSI
0376 A4FF           AND     #$FF
0378 2606           BNE     ADCC        ;RETURN IF PRESURE IS GREATER
037A B611           LDA     ADLF
037C A4E0           AND     #$E0
037E 2701           BEQ     ADCD
0380 81     ADCC:   RTS
0381 3F10   ADCD:   CLR     ADHE
0383 3F11           CLR     ADLF
0385 81             RTS                 ;RETURN FROM SUBROUTINE

0386                ;DOUBLE PRECISION ADD/FILTER ROUTINE FOR A/D
0386 9E     DADD:   CLC                 ;CLEAR CARRY
0387 B61C           LDA     F_
0389 BB11           ADD     ADLF
038B B71C           STA     F_
038D B61B           LDA     F+
038F B910           ADC     ADHE
0391 B71B           STA     F+
0393 81             RTS

0394                ;TIMER USED TO PROVIDE CLOCK FOR LCD DISPLAY ON PB4
0394 1F05   TINTR:  BCLF    7,S         ;CLEAR INTERRUPT
0396 3F01           CLR     MDE
0398 9A             CLI                 ;ALLOW INTERUPTS FROM RECDI TO HAVE PRIORITY
0399 0A172A         BRSET   5,LCDCNTRL
039C 1A01           BSET    5,MDE
```

```
037E 1601          BSET    T,LC9
0340 1701          BCLF    T,LC9
03A2 1A17          BSET    S,SCC1
0344 201E          BRA     T12
034A                                  ;PRINT OUT A/D VALUE ON FIRST LINE
```

| 1    | 2     | 3     | 4     | 5     |
|------|-------|-------|-------|-------|

```
034A AE04          PRINT:  LDI     #-
034C E519          PRIN1:  LDA     ECL,I      ;GET HIGH ORDER VALUE
034E AE70                  ADI     #30H       ;CONVERT TO ASCII VALUE
03A0 CD01A4                JSR     PUTC       ;SEND CHARACTER
034F 5A                    DECI
03BC 2AF8                  BPL     PRIN1
03BE A60D                  LDA     #1D        ;ASCII CARRIAGE RETURN
03B4 CD01A4                JSR     PUTC
03B7 A60A                  LDA     #1A        ;ASCII LINE FEED
03B9 CD01A4                JSR     PUTC
03BC B620          TI2:    LDA     AFE
03BE A110                  CMF     #10H
03C0 26CC                  BNE     TERM
03C2 CD0C00                JSR     DISP       ;DISPLAY VALUE ON LCD
03C5 81            TERM:   RTS
03C6 1B01          TI1:    BCLR    S,MOD
03C8 1601                  BSET    T,LC9
03CA 1701                  BCLR    T,LC9
03CC 1B17                  BCLR    S,SCC1
03CE CD0244                JSR     INFE       ;GET POSITION OF ROTARY SWITCH
03D1 BE1A                  LDX     PFOS       ;SET CHANNEL SWITCH POSITION
03D3 2704                  BEQ     TI4        ;ALLOW PRESSURE DISPLAY DURING CALIBRATE
03D5 B628                  LDA     MODE
03D7 2606                  BNE     TI4
03D9 5C                    INCX
03DA 5C                    INCX
03DB 5C                    INCX                ;CALIBRATE MODE ALLOWS TEMP AND ZERO DISPLAY
03DC 5C                    INCX
03DD BF1A                  STX     PFOS
03DF CD0201          TI4:  JSR     ADC        ;GET A VALUE FROM THE A/D CONVERTER(ADL+ADH)
03E2 CD033E                JSR     FADI       ;ADL/FILTER A/D READING
03E5 AE05                  LDI     #5
03E7 CD0201                JSR     ADC
03EA 9B                    CLC               ;DOUBLE PRECISION ADD TEMP
03EB B62E                  LDA     T
03ED BB11                  ADD     ADL
03EF B72E                  STA     T
03F1 B62F                  LDA     TH
03F3 B910                  ADC     ADHE
03F5 B72F                  STA     TH
03F7 3A20                  DEC     AFE
03F9 2676                  BNE     TI0
03FB A610                  LDA     #10H
03FD B720                  STA     AFE
03FF AE04                  LDI     #4         ;DIVIDE BY 16
0401 341E          FSHF1:  LSR     PL
0403 361C                  ROR     PL
0405 5A                    DECI
0406 26F8                  BNE     FSHF1
0408 B61A                  LDA     PFOS
040A 2704                  BEQ     TC0
```

| 1    | 2     | 3     | 4     | 5     |
|------|-------|-------|-------|-------|

```
040C B62E                  LDA     MODE
040E 27E7                  BEQ     TI2
0410 AE04          TC0:    LDI     #4         ;DIVIDE TEMP BY 16
0412 342F          FSHF2:  LSR     TH
```

```
0414 3625          ROR     T.
0416 5A            DECY
0417 26F5          BNE     FEHF?
0419 B614          LDA     FRCE    ;SAVE IT
041B B71C          STA     BVAL
041D B61E          LDA     PH
041F B72F          STA     PH
0421 B61D          LDA     PL
0423 B72A          STA     PL
0425 B62F          LDA     TH
0427 B71E          STA     PH
0429 B62E          LDA     TL
042B B71D          STA     PL
042D A635          LDA     #F
042F B714          STA     PAGE
0431 CD01CF        JSR     MULT    ;GET TEMP COEF
0434 AE10          LDX     #10     ;MULTIPLY COEF TIMES A/D VALUE
0436 3F1D          CLR     TEMPA
0438 3F1E          CLR     TEMPB
043A 3610          ROR     ADHI
043C 3611          ROR     ADLO
043E 2400  SNXT:   BCC     SROT
0440 B61E          LDA     TEMPB
0442 BB2D          ADD     SL
0444 B71E          STA     TEMPB
0446 B61D          LDA     TEMPA
0448 B92F          ADC     SH
044A B71D          STA     TEMPA
044C 361D  SROT:   ROR     TEMPA
044E 361E          ROR     TEMPB
0450 3610          ROR     ADHI
0452 3611          ROR     ADLO
0454 5A            DECX
0455 26E7          BNE     SNXT
0457 B61D          LDA     ADHI    ;TEMP CORRECTED COEF IS IN QH AND TEMPB
0459 B71D          STA     PL
045B B61E          LDA     TEMPB
045D B71E          STA     PH
045F B61C          LDA     BVAL
0461 B714          STA     PAGE
0463 CD01CF TI5:   JSR     MULT
0466 CD026E        JSR     ETBCD   ;CONVERT READING TO BCD IVAL -> BVAL
0469 3F1D          CLR     QH
046B 3F1C          CLR     QL      ;ZERO A/D READINGS
046D 3F2E          CLR     TL
046F 3F2F          CLR     TH
0471 81    TI3:    RTS
```

| 1 | 2 | 3 | 4 | 5 |
|---|---|---|---|---|
| 0472 |  |  |  | ;DATA ARRAYS |
| 0472 01 | TCHN: | DB |   | ;LIST OF CHANNEL ASSIGNMENTS BY SWITCH POSITION |
| 0473 01 |  | DB |   | ;OLD VALUE WAS 4 |
| 0474 01 |  | DB |   | ;PRESSURE TRANSDUCER CHANNEL |
| 0475 01 |  | DB |   |  |
| 0476 01 |  | DB |   |  |
| 0477 01 |  | DB |   |  |
| 0478 01 |  | DB |   |  |
| 0479 01 |  | DB |   |  |
| 047A 02 |  | DB |   | ;OLD VALUE WAS 6 |
| 047B 02 |  | DB |   | ;OLD VALUE WAS 6 |
| 047C |  |  |   | ;LIST OF SCALING FACTORS FOR EACH CHANNEL |
| 047C 0441 | SFAC: | DW | 2624 | ;PRESSURE=A/D VALUE * 10.25 |

What is claimed is:

1. An apparatus for determining torque and representing digital torque readout in a torque wrench system, the torque wrench system including a fluid powered torque wrench supplied by fluid from a pump and further comprising:

pressure sensing means for sensing the pressure level of the pump and generating a pressure level voltage signal;

converter means for converting said pressure level voltage signal from an analog signal to a digital signal;

microprocessor means for receiving said converted digitized pressure level voltage signal;

temperature sensing means for sensing the temperature of the pressure sensing means, and for generating a temperature compensation signal to said microprocessor means;

wrench size selector switch means for delivering a wrench size signal to said microprocessor means wherein said wrench size signal is based on the size of the wrench used in the wrench system; and digital display means associated with said microprocessor means wherein said microprocessor means processes said pressure level voltage signal, temperature compensation signal and wrench size signal and wherein said microprocessor generates a digital output of the real time torque level of the torque wrench, said real time torque level being displayed on said digital display means.

2. The apparatus of claim 1 wherein:

said pressure sensing means comprises pressure transducer means.

3. The apparatus of claim 1 wherein:

said temperature sensing means comprises temperature sensor transducer means.

4. The apparatus of claim 1 wherein:

said digital display means comprises liquid crystal display means.

5. The apparatus of claim 1 wherein said converter means includes:

amplifier means connected to receive said pressure level voltage signal and generate an output signal commensurate with the pressure level;

comparator means connected to receive an output signal from said amplifier means commensurate with the pressure relief;

digital to analog converter means connected to receive a sequence of digital voltage signals from said micorprocessor and to deliver said signals in sequence to said comparator means for comparison with said output signal from said amplifier means commensurate with the pressure level; and said comparator means being connected to said microprocessor means to deliver a signal to said microprocessor means when the digital voltage signal to said comparator means and the amplifier means output signal to said comparator means are approximately equal.

6. The apparatus of claim 5 further including:

multiplexer means, said multiplexer means being connected to receive said output signal from said amplifier means commensurate with pressure and also being connected to receive a voltage signal from said temperature sensor means commensurate with temperature;

said multiplexer means being connected to and controlled by said microprocessor means to selectively deliver signals commensurate with pressure or temperature to said comparator means; and said converter means, under the control of said microprocessor means, selectively delivering a sequence of digital voltage signals to said comparator means for comparison with inputs to said comparator means from said multiplexer means commensurate with either pressure or temperature.

7. The apparatus of claim 6 wherein said wrench size selector switch means includes:

multiple position switch selection means;

switch multiplexer means connected to said switch selector means and connected to said microprocessor means, said switch multiplexer means having a plurality of inputs from said microprocessing means and one output to said microprocessor; and each of said switch positions being connected to a unique combination of said inputs in said switch multiplexer means to define a binary code for each switch position which can be determined by said micorprocessor means to determine the switch selected.

8. The apparatus of claim 1 wherein said wrench size selector switch means includes:

multiple position switch selection means;

switch multiplexer means connected to said switch selector means and connected to said microprocessor means, said switch multiplexer means having a plurality of inputs from said microprocessor means and one output to said microprocessor; and each of said switch positions being connected to a unique combination of said inputs in said switch multiplexer means to define a binary code for each switch position which can be determined by said microprocessor means to determine the switch selected.

9. A method for determining torque and presenting digital torque readout in a torque wrench system, the torque wrench system including a fluid powered torque wrench supplied by fluid from a pump and comprising the steps of:

sensing the pressure level of the pump using pressure level sensing means and generating a pressure level voltage signal;

converting said pressure level voltage signal from an analog signal to a digital signal;

delivering said converted digitized pressure level voltage signal to microprocessor means;

sensing the temperature at which the pressure level sensing means is operating using temperature sensing means, and generating a temperature compensation signal for delivery to said microprocessor means;

delivering a wrench size signal to said microprocessor means wherein said wrench size signal is based on the size of the wrench used in the wrench system;

processing said pressure level voltage signal, temperature compensation signal and wrench size signal in said microprocessor means wherein said microprocessor generates a ditigal output of the real time torque level of the torque wrench; and displaying and real time torque level on digital display means associated with said microprocessor means.

10. The method of claim 9 wherein:

said pressure level sensing means comprises pressure transducer means.

11. The method of claim 9 wherein:

said temperature sensing means comprises temperature sensor transducer means.

12. The method of claim 9 wherein:

said digital display means comprises liquid crystal display means.

13. The method of claim 1 wherein said step of converting said pressure level voltage signal from an analog to digital signal includes the steps of:

generating in said microprocessor means a sequence of digital voltage signals of different values;

comparing said pressure level voltage signal with said sequence of digital voltage signals from said microprocessor means;

generating a digital signal when said one of said sequence of digital voltage signals is approximately equal to said pressure level voltage signal; and delivering said digital signal to said microprocessor means.

14. The method of claim 13 further including the steps of:
- delivering said pressure level voltage signal and said temperature compensation signal to multiplexer means;
- delivering a signal to said multiplexer means from said microprocessor means to select either said pressure level voltage signal or said temperature compensation signal for comparison with a sequence of digital voltage signals from said microprocessor means.

15. The method of claim 14 wherein the steps of delivering a wrench size signal includes:
- assigning a unique binary code to each wrench size commensurate with positions of a multiple position selection switch;
- interrogating to determine the binary code activated by the position of the switch; and
- informing the microprocessor means of the binary code.

16. The method of claim 9 wherein the steps of delivering a wrench size signal includes:
- assigning a unique binary code to each wrench size commensurate with positions of a multiple position selection switch;
- interrogating to determine the binary code activated by the position of the switch; and
- informing the microprocessing means of the binary code.

17. The method of claim 9 further including the step of:
- presetting the maximum operating pressure of the torque wrench system by setting a pressure relief valve based on a torque level displayed on said digital display means.

* * * * *